United States Patent [19]
Brunetti

[11] 3,873,498
[45] Mar. 25, 1975

[54] ESTERS OF 4-HYDROXYMETHYL-1-PHOSPHA-2,6,7-TRIOXABICYCLO [2,2,2] OCTANE AND P-HYDROXYPHENYLCARBOXYLIC ACIDS AS STABILIZERS FOR ORGANIC POLYMERS

[75] Inventor: Heimo Brunetti, Reinach, Switzerland

[73] Assignee: Ciba-Geigy Corporation, Ardsley, N.Y.

[22] Filed: July 25, 1973

[21] Appl. No.: 382,634

Related U.S. Application Data

[62] Division of Ser. No. 244,849, April 17, 1972, Pat. No. 3,808,296.

[30] Foreign Application Priority Data

| Apr. 22, 1971 | Switzerland | 5846/71 |
| Nov. 3, 1971 | Switzerland | 16044/71 |
| Mar. 7, 1972 | Switzerland | 3311/72 |

[52] U.S. Cl. ............... 260/45.95 D, 260/45.7 R, 260/45.8 R, 260/45.85

[51] Int. Cl. ............... C08f 45/58, C08f 45/62
[58] Field of Search .... 260/45.7 P, 45.8 R, 45.95 D

[56] References Cited
UNITED STATES PATENTS

| 2,643,261 | 6/1953 | Matuszak et al | 260/937 |
| 3,287,448 | 11/1966 | Ratz | 260/937 |
| 3,493,637 | 2/1970 | Coupland | 260/45.8 |
| 3,516,963 | 6/1970 | Friedman | 260/45.8 |
| 3,746,758 | 7/1973 | Spivack | 260/45.7 |

*Primary Examiner*—Eugene G. Rzucidlo
*Attorney, Agent, or Firm*—Nestor W. Shust

[57] ABSTRACT

Esters of 4-hydroxymethyl-1-phospha-2,6,7-trioxabicyclo[2,2,2]octan and p-hydroxyphenylcarboxylic acids are stabilisers for organic materials. They are prepared by reacting the 4-hydroxymethyl-1-phospha-2,6,7-trioxabicyclo[2,2,2]octan with a corresponding p-hydroxymethylcarboxylic acid.

15 Claims, No Drawings

ESTERS OF 4-HYDROXYMETHYL-1-PHOSPHA-2,6,7-TRIOXABICYCLO [2,2,2] OCTANE AND P-HYDROXYPHENYLCARBOXYLIC ACIDS AS STABILIZERS FOR ORGANIC POLYMERS

This is a division of application Ser. No. 244,849, filed on Apr. 17, 1972, now U.S. Pat. No. 3,808,296.

The present invention relates to new compounds, their manufacture and their use for stabilising organic material.

It is known to use derivatives of sterically hindered phenols as stabilisers for plastics against thermo-oxidative and light-induced degradation. It is also known to use phosphorus compounds as co-stabilisers together with phenolic antioxidants for stabilising, such mixtures frequently having a synergistic effect. It is likewise known to use bicyclic phosphites, in which the phosphorus represents the bridgehead atom, as phosphorus compounds in such mixtures.

The surprising discovery has now been made that the new compounds of the general formula I

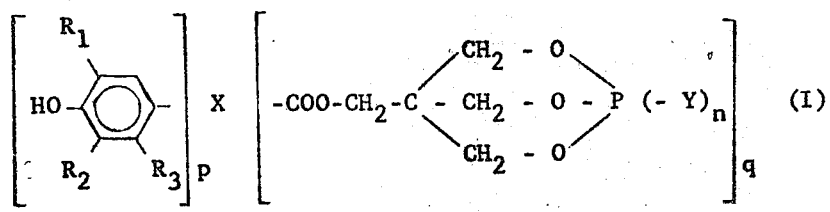

wherein X represents the radical of an alkane containing from 1-19 carbon atoms, in which not more than three bonds are formed between the same carbon atoms and the carboxyl and phenol groups, the radical of an aralkane, alkene, oxaalkane or thiaalkane each containing from 2-19 carbon atoms, in which not more than three bonds are formed between the same carbon atom and the carboxyl and phenol groups, or represents the direct bond, $R_1$ and $R_2$ independently represent hydrogen, alkyl containing from 1-8 carbon atoms, cycloalkyl containing from 6-8 carbon atoms or aralkyl containing from 7-9 carbon atoms, with $R_1$ preferably representing alkyl, cycloalkyl or aralkyl containing the same number of carbon atoms as cited hereinbefore, $R_3$ represents hydrogen or methyl, preferably hydrogen, Y represents oxygen or sulphur, $p$ and $q$ independently represent 1 or 2 and $n$ represents 0 or 1, constitute stabilisers whose action is substantially better than the action of the above mentioned synergistic mixtures of phenolic antioxidants and phosphorus compounds.

Preferred compounds are those of the formula I, wherein X represents the radical of an alkane containing from 1-9, preferably 1-6, but especially 1-3 carbon atoms, the radical of an alkene containing from 2-9, preferably 2-5 carbon atoms, —CH=CH— being particularly preferred, the radical of an oxaalkane or thiaalkane containing from 2-9, preferably 2 to 5 carbon atoms, —CH$_2$—S—CH$_2$— being particularly preferred, in which radicals not more than two bonds are formed between the same carbon atom and the carboxyl and phenol groups, or represents the direct bond, $R_1$ represents alkyl contaning from 1-5, preferably 1-4 carbon atoms, or cycloalkyl containing from 6-8 carbon atoms, $R_2$ represents hydrogen, alkyl containing from 1-5 carbon atoms or cycloalkyl containing from 6-8 carbon atoms, but preferably represents alkyl containing from 1-4 carbon atoms, $R_3$ represents hydrogen, $p$ and $q$ independently represent 1 or 2 and $n$ represents 0 or 1.

Particularly preferred are compounds of the formula I, wherein X represents the direct bond or one of the radicals

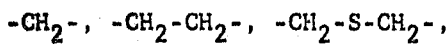

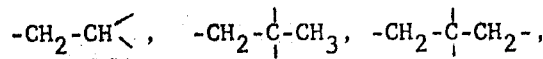

$R_1$ represents methyl, isopropyl or tert.butyl, $R_2$ represents hydrogen, methyl, isopropyl or tert.butyl, $R_3$ represents hydrogen, $p$ and $q$ independently represent 1 or 2 and $n$ represents 0.

Where X in formula I represents the radical of an alkane, it may be

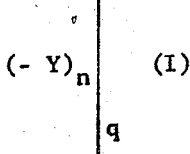

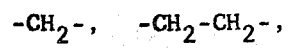

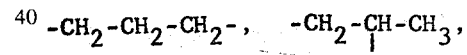

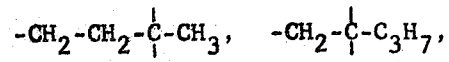

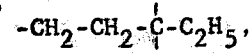

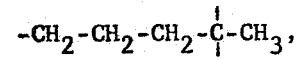

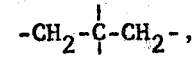

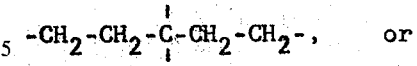      or

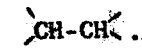 .

Where X in formula I represents the radical of an alkene, it may be —CH=CH— or

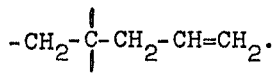

Where X in formula I represents the radical of an aralkane, it may be

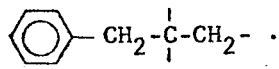

Where X in formula I represents the radical of an oxa or thiaalkane, it may be

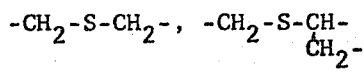

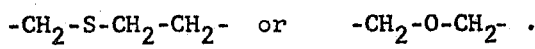

If $R_1$ and/or $R_2$ are alkyl, they may represent methyl, ethyl, isopropyl, tert.butyl, sec.butyl, t-pentyl or t-octyl. If $R_1$ and/or $R_2$ are cycloalkyl, they may be cyclohexyl, α-methylcyclohexyl or cyclooctyl. If $R_1$ and/or $R_2$ are aralkyl, they may be benzyl, α-methylbenzyl or α,α-dimethylbenzyl.

The compounds of the formula I may be manufactured in various ways: for example by reacting 1 mole of a compound of the general formula II

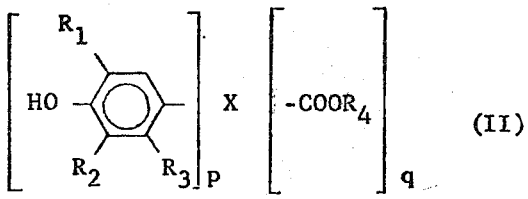

wherein $R_4$ represents a lower alkyl group, in particular the methyl or ethyl group, with $q$ moles of a compound of the formula III

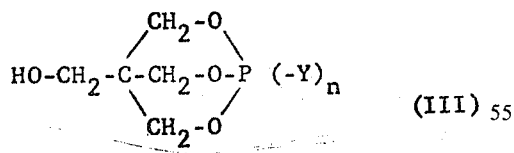

in the presence of catalytic amounts of a basic catalyst. In this reaction, $q$ moles of $R_4OH$ are split off.

The manufacture of the compounds of the formula III is described in J. Chem. Soc. 84 610 (1962).

This process of manufacture can be modified by initially reacting 1 mole of a trialkylphosphite, for example trimethyl or triethylphosphite, or of a triarylphosphite, for example triphenylphosphite, or of a corresponding phosphate or thiophosphate of the formula IV

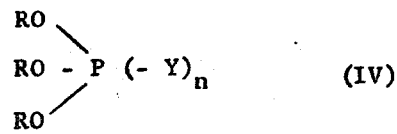

wherein R represents alkyl, for example methyl or ethyl, or aryl, for example phenyl, and Y and $n$ have the meanings given under formula I, with 1 mole of pentaerythritol in the presence of a basic catalyst to give the compound of the formula III and then reacting this latter in situ with one-half or 1 mole of a compound of the formula II in the presence of the same or of another basic catalyst.

The surprising discovery has been made that the compounds of the formula I can also be manufactured in good yields in such a way that 1 mole each of a compound of the formula IV and pentaerythritol and 1 or one-half mole of the compound of the formula II are reacted together. The reaction leads in the presence of a basic catalyst direct to the compounds of the formula I. It was unexpected that this selective reaction firstly of three hydroxyl groups and then of the fourth hydroxyl group of the pentaerythritol in a single step process and with high yields is practicable.

It is also possible to manufacture the compounds of the formula I by reacting 1 mole of a compound of the general formula II with 1 or 2 moles of pentaerythritol in the presence of a basic catalyst, when a compound of the formula V is formed:

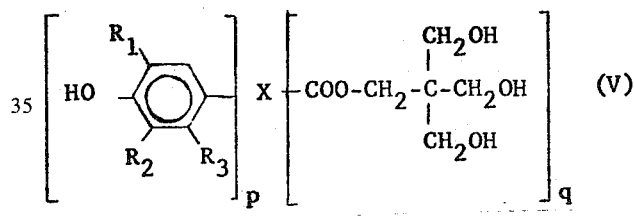

wherein $R_1$, $R_2$, $R_3$, X, $p$ and $q$ have the meanings given under formula I.

Without any intermediate processing, the compound of the formula V is reacted direct with $q$ moles of a compound of the formula IV in the presence of the same or of another basic catalyst to give the compounds of the formula I. It was unexpected that the reaction sequence of the hydroxyl groups of the pentaerythritol for the manufacture of the compounds of the formula I can be reversed at will.

As basic catalysts there are used, for example, alkali amides, for example sodium or lithium amide, alkali hydroxides, for example lithium, sodium or potassium hydroxide, alcoholates, for example sodium and magnesium alcoholates of methanol, ethanol or tert.butanol, or tertiary amines, such as triethylamine. Preferred basic catalysts are sodium methylate, sodium hydride and lithium amide.

As solvents, aliphatic or aromatic hydrocarbons, such as boiling range benzine, benzene, toluene or xylene may be used. The process is carried out preferably without a solvent.

It is possible to manufacture compounds of the formula I in which $n = 1$ by subsequently reacting compounds of the formula I, wherein $n = 0$, with oxidants such as hydrogen peroxide, cumene hydroperoxide, sulphur, disulphides or mercaptans. However, it is also possible to manufacture them by reacting a compound of the formula III, in which $n = 1$, with a compound of the formula II or VI.

Compounds of the formula I can also be manufactured by reacting a compound of the general formula VI

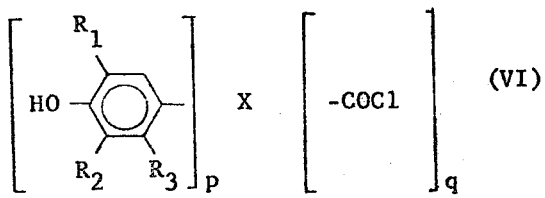

with 1 or 2 moles of a compound of the formula III in the presence of a base to neutralise the hydrogen chloride which forms.

The compounds of the formula I are used as stabilisers for organic substrates, examples of which are:

1. Polymers, which are derived from singly or doubly unsaturated hydrocarbons, such as polyolefines, for example polyethylene which may optionally be cross-linked, polypropylene, polyisobutylene, polymethylbutene-1, polymethylpentene-1, polybutene-1, polyisoprene, polybutadiene, polystyrene, polyisobutylene, copolymers of the monomers based on the cited homopolymers, such as ethylene-propylene copolymers, propylene-butene-1 copolymers, propylene-isobutylene copolymers, styrene-butadiene copolymers, and terpolymers of ethylene and propylene with a diene, for example hexadiene, dicyclopentadiene or ethylidene-norbonene; mixtures of the above cited homopolymers, for example mixtures if polypropylene and polyethylene, polypropylene and polybutene-1, propylene and polyisobutylene.

2. Vinyl polymers which contain halogen, such as polyvinyl chloride, polyvinylidene chloride, polyvinyl fluoride, polychloropropene and chlorinated rubbers.

3. Polymers which are derived from $\alpha,\beta$-unsaturated acids and their derivatives, such as polyacrylates and polymethacrylates, polyacrylamides and polyacrylonitrile, as well as their copolymers with other vinyl compounds, such as acrylonitrile/butadiene/styrene, acrylonitrile/styrene and acrylonitrile/styrene/acrylic ester copolymerisates.

4. Polymers which are derived from unsaturated alcohols and amines and their acyl derivatives or acetals, such as polyvinyl alcohol, polyvinyl acetate, stearate, benzoate and maleate, polyvinylbutyral, polyallyl phthalate, polyallyl melamine and their copolymers with other vinyl compounds, such as ethylene/vinyl acetate copolymers.

5. Homo- and copolymers which are derived from epoxides, such as polyethylene oxide or the polymerisates which are derived from bisglycidyl ethers.

6. Polyacetyls, such as polyoxymethylene and polyoxyethylene, and those which contain ethylene oxide as comonomer.

7. Polyphenylene oxides.

8. Polyurethanes and polyureas.

9. Polycarbonates.

10. Polysulphones.

11. Polyamides and copolyamides which are derived from diamines and dicarboxylic acids and/or from aminocarboxylic acids or the corresponding lactames, such as polyamide 6, polyamide 6/6, polyamide 6/10, polyamide 11, polyamide 12.

12. Polyesters which are derived from dicarboxylic acids and dialcohols and/or from hydroxycarboxylic acids or the corresponding lactones, such as polyethylene glycol terephthalate, poly-1,4-dimethylolcyclohexane terephthalate, and their starting materials, such as lower terephthalic alkyl ester.

13. Cross-linked polymerisates which are derived from aldehydes on the one hand and from phenols, ureas and melamines on the other, such as phenol-formaldehyde, urea-formaldehyde and melamine-formaldehyde resins.

14. Alkyd resins, such as glycerol-phthalic acid resins and their mixtures with melamine-formaldehyde resins.

15. Unsaturated polyester resins, which are derived from copolyesters of unsaturated and unsaturated dicarboxylic acids with polyvalent alcohols, as well as vinyl compounds as cross-linking agents, and also their difficultly combustible modifications which contain halogen.

16. Natural polymers, such as cellulose, rubber, proteins, and their chemically modified homologous compounds, such as cellulose acetates, propionate and butyrates, or the cellulose ethers, such as methyl cellulose.

The compounds of the formula I are incorporated into the substrates in a concentration of 0.005 to 5 percent by weight referred to the material to be stabilised.

Preferably 0.05 to 2.0 percent by weight of the compounds, 0.1 to 1.0 percent by weight being particularly preferred, referred to the material to be stabilised is incorporated into it. The incorporation may take place before, during or after the polymerisation, for example by blending in at least one of the compounds of the formula I and optionally further additives by methods which are conventionally used in the art, before or during the moulding, or also by applying the dissolved or dispersed compounds to the polymer, optionally with subseqent evaporation of the solvent.

In the case of cross-linked polyethylene, the compounds are added before the cross-linking.

As further additives together with which it is possible to use the stabilisers, the following may be cited:

1. Antioxidants of the amino- and hydroxyaryl series. In the case of the latter, the sterically hindered phenol compounds may be cited, e.g.:

2,2'-thiobis-(4-methyl-6-tert.butylphenol),
4,4'-thiobis-(3-methyl-6-tert.butylphenol),
2,2'-methylene-bis-(4-methyl-6-tert.butylphenol),
2,2'-methylene-bis-(4-ethyl-6-tert.butylphenol),
4,4'-methylene-bis-(2-methyl-6-tert.butylphenol),
4,4'-butylidene-bis-(3-methyl-6-tert.butylphenol),
2,2'-methylene-bis-[4-methyl-6-($\alpha$-methylcyclohexyl)-phenol],
2,6-di-(2-hydroxy-3-tert.butyl-5-methylbenzyl)-4-methylphenol,
2,6-di-tert.butyl-4-methylphenol,
1,1,3-tris-2-methyl-(4-hydroxy-5-tert.butyl-phenyl)-butane,
1,3,5-trimethyl-2,4,6-tri-(3,5-di-tert.butyl-4-hydroxybenzyl)-benzene,
esters of $\beta$-4-hydroxy-3,5-di-tert.butylphenyl-propionic acid with mono- or polyvalent alcohols, such as methanol, ethanol, octadecanol, hexane diol, nonane diol, trimethylhexane diol, thiodiethylene glycol, trimethylol ethane or pentaerythritol.

2,4-bis-octylmercapto-6-(4-hydroxy-3,5-di-tert.butylanilino)-s-triazine,
2,4-bis-(4-hydroxy-3,5-di-tert.butylphenoxy)-6-octylmercapto-s-triazine,
1,1-bis-(4-hydroxy-2-methyl-5-tert.butyl-phenyl)-3-dodecyl-mercapto-butane,
4-hydroxy-3,5-di-tert.butylbenzyl-phosphonic ester, such as dimethyl-, diethyl- or dioctadecyl ester,
(3-methyl-4-hydroxy-5-tert.butylbenzyl)-malonic acid-dioctadecyl ester,
S-(3,5-dimethyl-4-hydroxyphenyl)-thioglycolic acid octadecyl ester,
esters of bis-(3,5-di-tert.butyl-4-hydroxybenzyl)-malonic acid, such as didodecyl ester, dioctadecyl ester, 2-dodecylmercaptoethyl ester and p.tert.octylphenyl ester,
tris(3,5-di-tert.butyl-4-hydroxybenzyl)-isocyanurate.

Among the aminoaryl derivatives, mention may be made of aniline and naphthylamine derivatives and their heterocyclic derivatives, e.g.:
phenyl-1-naphthylamine,
phenyl-2-naphthylamine,
N,N'-diphenyl-p-phenylenediamine,
N,N'-di-2-naphthyl-p-phenylenediamine,
N,N'-di-sec.butyl-p-phenylenediamine,
6-ethoxy-2,2,4-trimethyl-1,2-dihydroquinoline,
6-dodecyl-2,2,4-trimethyl-1,2-dihydroquinoline,
mono- and dioctyliminodibenzyl,
polymerised 2,2,4-trimethyl-1,2-dihydroquinoline.

When using the compounds of the formula I in combination with the above cited amino compounds, it must be pointed out that, on account of the tendency of these latter to cause discolouration, the stabilised polymer no longer possesses such good colour properties.

2. Ultraviolet absorbers and light filters, e.g.:
 a. 2-(2'-hydroxyphenyl)-benztriazoles, for example the 5'-methyl-, 3',5'-di-tert.butyl-, 5'-tert.butyl-, 5-chloro-3'-, 5'tert.butyl-, 5-chloro-3'-tert.butyl-5-methyl-, 3'-sec.butyl-5'-tert.butyl-, 3'-[α-methylbenzyl]-5'-methyl-, 3'-[α-methylbenzyl]-5'-methyl-5-chloro-, 4'-octoxy-, 3',5'-di-tert.-amyl-, 3'-methyl-5'-carbomethoxyethyl-, 5-chloro-3',5'-di-tert.amyl-derivative,
 b. 2,4-bis-(2'-hydroxyphenyl)-6-alkyl-3-triazines, e.g. the 6-ethyl or 6-undecyl derivative,
 c. 2-hydroxy-benzophenones, e.g. the 4-hydroxy, 4-methoxy, 4-octoxy, 4-decyloxy, 4-dodecyloxy, 4,2',4'-tri-hydroxy or 2'-hydroxy 4,4'-dimethoxy derivative,
 d. 1,3-bis-(2'-hydroxy-benzoyl)-benzenes, e.g. 1,2-bis-(2'-hydroxy-4'-hexyloxy-benzoyl)-benzene, 1,3-bis-(2'-hydroxy-4'-octoxy-benzoyl)-benzene, 1,3-bis-(2'-hydroxy-4'-dodecyloxy-benzoyl)-benzene.
 e. Aryl esters of optionally substituted benzoic acids, e.g.: phenylsalicylate, octylphenylsalicylate, dibenzoylresorcinol, bis-(4-tert,butylbenzoyl)-resorcinol, benzoylresorcinol, 3,5-di-tert.butyl-4-hydroxybenzoic acid-2,4-di-tert.butyl-phenyl ester, -octadecyl ester or -2-methyl-4,6-ditert.butylphenyl ester.
 f. Acrylates, e.g.: α-cyano-β,β-diphenylacrylic acid ethyl- and isoctyl ester, α-carbomethoxy-cinnamic acidmethyl ester, α-cyano-β-methyl-p-methoxy-cinnamic acidmethyl and butyl ester, N-(β-carbomethoxy-vinyl)-2-methyl-indoline.
 g. Nickel compounds, e.g.: Nickel complexes of 2,2-thiobis-(4-tert.octylphenol), such as the 1:1 and 1:2 complex, optionally with other ligands such as n-butylamine, nickel complexes of bis-(4-tert.octylphenyl)-sulphone, such as the 2:1 complex, optionally with other ligands, for example 2-ethylcapronic acid, nickel dibutyldithiocarbamate, nickel salts of 4-hydroxy-3,5-di-tert.butylbenzylphosphonic acid monoalkyl esters, for example methyl, ethyl or butyl ester, the nickel complex of 2-hydroxy-4-methyl-phenylundecyl-ketone-oxime,
 h. oxalic acid diamides, e.g. 4,4'-di-octyloxyocanilide, 2,2'-octyloxy-5,5'-di-tert.butyl-oxanilide, 2,2'-di-dodecyloxy-5,5'-di-tert.butyl-oxanilide,
 i. 2,2,6,6-tetramethylpiperidines, for example 2,2,6,6-tetramethyl-4-steaoryloxypiperidine, bis-(2,2,6,6-tetramethyl-4-hydroxypiperidine)-sebacate.

3. Phosphites, for example
triphenylphosphite,
diphenylalkylphosphites,
phenyldialkylphosphites,
trinonylphenylphosphite,
trilaurylphosphite,
trioctadecylphosphite,
3,9-di-isodecyloxy-2,4,8,10-tetraoxa-3,9-diphosphaspiro-(5,5)-undecane,
tri-(4-hydroxy-3,5-di-tert.butylphenyl)-phosphite.

4. Compounds which decompose peroxide, e.g. esters of β-thiodipropionic acid, for example lauryl, stearyl, myrystyl or tridecyl ester, salts of 2-mercaptobenzimidazols, for example the zinc salt and diphenylthiourea for polyolefines.

5. Polyamide statilisers, e.g. copper salts in combination with idoides and/or further phosphorus compounds and salts of divalent manganese.

6. Basic costabilisers, e.g. polyvinylpyrrolidone, melamine, benzoguanimine, triallyl cyanurate, dicyandiamide, urea derivatives, hydrazine derivatives, amines, polyamides, polyurethanes, alkali and alkaline earth salts of higher molecular saturated or unsaturated fatty acids, for example the laurates, myristates, palmitates, stearates, oleates or ricinoleates of calcium, magnesium, zinc or potassium. Such salts are added advantageously to the stabiliser according to the invention in concentrations of 0.1–40 percent by weight, preferably 1–10 percent by weight, before the incorporation into the material to be protected.

7. PVC stabilisers such as organic tin compounds, organic lead compounds and Ba/Cd salts of fatty acids.

8. Nucleination agents, e.g. 4-tert.butylbenzoic acid, adipic acid, diphenylacetic acid.

9. Other additives, such as plasticisers, lubricants, for example glycerol monostearate, emulsifiers, antistatic agents, flame-proofing agents, pigments, carbon black, asbestos, glass fibres, china clay, talcum.

The following Examples describe the invention in more detail, the parts and percentages being by weight.

EXAMPLE 1

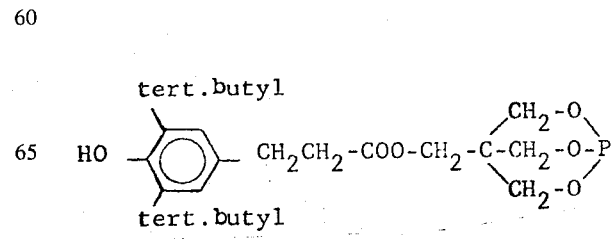

13.6 g (0.1 mole) of pentaerythritol and 13.6 g (0.11 mole) of trimethyl phosphite are introduced into a reaction vessel with a descending condenser and connected at the outlet side with a freezing trap and to a vacuum unit, treated with 0.25 g (4.6 mole) of sodium methylate and the mixture is heated to 110°C. The methanol formed during the reaction is distilled off continuously. When the teoretical amount of methanol (12 ml) has been distilled, the reaction mixture is heated briefly to 140°C, then treated under nitrogen with 32.2 g (0.11 mole) of 3-(3,5-ditert.butyl-4-hydroxyphenyl)-propionic acid methyl ester, in the process of which a homogeneous melt is formed. While stirring, an additional 0.2 g of sodium methylate is added and the reaction vessel is evacuated. The methanol formed during the reaction distills into the freezing trap. The temperature is kept for 60 minutes at 140°C, then raised to 160°C and kept thereat for a further hour. The homogeneous melt is cooled to 100°C. After discharging with nitrogen, 30 ml of ethanol and 0.5 ml of glacial acetic acid are added all at once and the warm solution is cooled, in the course of which the product crystallises. The product is filtered with duction, washed with a small amount of ice-cold ethanol and dried, to yields 34 g of 4-hydroxy-methyl-1-phospha-2,6,7-trioxabicyclo[2,2,2]octane-3-(3,5-ditert.butyl-4-hydroxyphenyl)-propionate (stabiliser No. 1), which melts at 154°–155°C. The compound may be recrystallised from ethanol or ligroin.

If the above Example the 3-(3,5-ditert.butyl-4-hydroxyphenyl)-propionic acid methyl ester is replaced by the corresponding alkyl substituted 4-hydroxy-phenyl-propionic acid methyl ester, the corresponding esters of the 4-hydroxy-methyl-1-phospha-2,6,7-trioxabicyclo[2,2,2]octane of Table 1 with the indicated melting points are obtained by carrying out the process in an analogous manner:

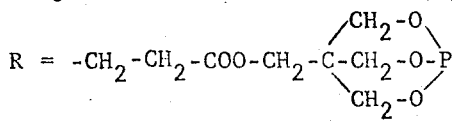

TABLE 1

|  | Melting Point | Stabiliser No. |
|---|---|---|
| tert.butyl<br>HO-⟨O⟩-R<br>CH₃ | 78°C | 2 |
| iso-propyl<br>HO-⟨O⟩-R<br>iso-Propyl | 102°C | 3 |
| tert.butyl<br>HO-⟨O⟩-R<br>H | 150°C | 4 |
| tert.butyl<br>HO-⟨O⟩<br>CH₃  CH₃ |  |  |

EXAMPLE 2

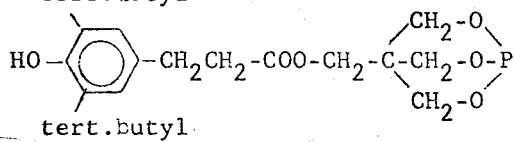

13.6 g (0.1 mole) of pentaerythritol, 13.6 g (0.11 mole) of trimethyl phosphite, and 32.2 g (0.11 mole) of 3-(3,5-ditert.butyl-4-hydroxyphenyl)-propionic acid methyl ester are introduced into a reaction vessel with a descending condenser and connected at the outlet side with a freezing trap and to a vacuum unit. The mixture is heated to 70°C and, while stirring slowly, treated with 0.5 g of sodium methylate. The internal temperature is raised to 110°C, in the course of which the methanol formed during the reaction is distilled off. The evolution of methanol ceases when about 12 ml have passed over. The temperature of the reaction mixture is then raised to 160°C over the course of 30 minutes, the reaction vessel evacuated and the temperature maintained for a further hour.

The homogeneous melt is cooled to 100°C. After discharging with nitrogen, 30 ml of ethanol and 0.5 ml of glacial acetic acid are added all at once and the warm solution is cooled, in the course of which the product crystallises. The product is filtered with suction, washed with a small amount of ice-cold ethanol and dried at 60°C, to yield 36 g of 4-hydroxymethyl-1-phospha-2,6,7-trioxabicyclo[2,2,2]octane-3-(3,5-ditert.butyl-4-hydroxyphenyl)-propionate (stabiliser No. 1), which melts at 154°–155°C. The compound may be recrystallised from ethanol or ligroin.

EXAMPLE 3

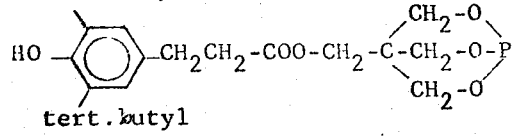

13.6 g (0.1 mole) of pentaerythritol and 32.2 g (0.11 mole) of 3-(3,5-ditert.butyl-4-hydroxyphenyl)-propionic acid methyl ester are introduced into a reaction vessel with a descending condenser and connected at the outlet side with a freezing trap and a vacuum unit. The mixture is heated to 100°C and 0.25 g of sodium methylate is added. The reaction vessel is evacuated and then the mixture is heated to 150°C, in the process of which methanol distills into the freezing trap. When the theoretical amount (4 ml) has passed over, the mixture is cooled to 90°C and treated with 13.6 g (0.11 mole) of trimethyl phosphite and a further 0.25 g of sodium methylate. The internal temperature is raised to 110°C, and in the course of about 3 hours a further 12 ml of methanol distill into the freezing trap. This second step of the reaction is carried out at normal pressure. Finally, the reaction vessel is briefly evacuated, the temperature brought to 100°C and a mixture of 30 ml of ethanol and 0.5 ml of glacial acetic acid is added all at once. The warm solution is cooled, in the process of which the product crystallises. The product is filtered with suction, washed with a small amount of ice-cold ethanol and dried at 60°C to yield 30 g of 4-hydroxymethyl-1-phospha-2,6,7-trioxabicyclo[2,2,2]octane-3-(3,5-ditert.butyl-4-hydroxyphenyl)-propionate (stabiliser No. 1), which melts at 154°–155°C. The compound may be recrystallised from ethanol or ligroin.

EXAMPLE 4

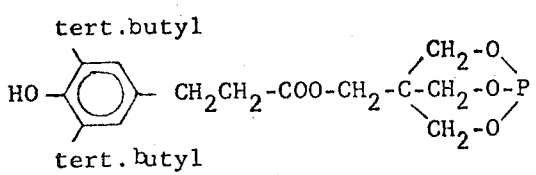

16.4 g of 4-hydroxymethyl-1-phospha-2,6,7-trioxabicyclo-2,2,2-octane are dissolved in 100 ml of dimethyl acetamide. While stirring vigorously, a solution of 33 g of 3-(3,5-ditert.butyl-4-hydroxyphenyl)-propionic chloride in 100 ml of dimethyl acetamide is added dropwise, in the process of which the temperature rises to 45°C. The mixture is stirred for 1 hour at 80°C, cooled and poured into 2 litres of water. The product which initially separates out in the form of an oil crystallises in the course of several hours. It is filtered with suction, then recrystallised from the 4-fold amount of alcohol to yield 4-hydroxymethyl-1-phospha-2,6,7-trioxybicyclo[2,2,2]octane-3-(3,5-ditert.butyl-4-hydroxyphenyl)-propionate (stabiliser No. 1), which melts at 156°C.

EXAMPLE 5

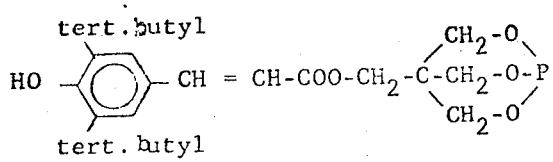

30.4 g of 3-(3,5-ditert.butyl-4-hydroxyphenyl)-acrylic acid ethyl ester and 16.4 g of 4-hydroxymethyl-1-phospha-2,6,7-trioxabicyclo[2,2,2]octane are heated together to 150°C, when a homogeneous melt is formed. While stirring, 0.4 g of lithium amide is added, the mixture heated then to 160°C and this temperature kept for 12 hours. Upon cooling, the reaction mixture is treated with 250 ml of toluene, filtered and evaporated. The product is obtained in crystalline form by adding hexane. The resulting 4-hydroxymethyl-1-phospha-2,6,7-trioxabicyclo [2,2,2] octane-3-(3,5-ditert.butyl-4-hydroxyphenyl)-acrylate (stabiliser No. 5) melts at 197°C after repeated recrystallisation from toluene.

EXAMPLE 6

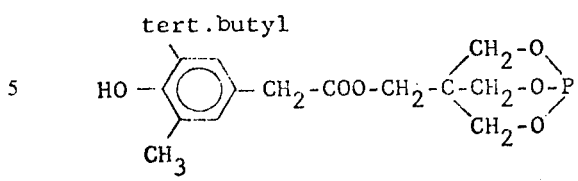

23.6 g of 3-tert.butyl-4-hydroxy-5-methyl-phenylacetic acid methyl ester and 16.4 g of 4-hydroxymethyl-1-phospha-2,6,7-trioxabicyclo[2,2,2]-octane are heated together to 130°C and the resulting homogeneous melt is treated, while stirring, with 0.4 g of lithium amide. The reaction vessel is evacuated and the temperature is kept for 2 hours at 130°C. After discharging with nitrogen and cooling, the reaction mixture is treated with 150 ml of toluene, filtered and evaporated. The product is obtained in crystalline form by adding hexane to the residue and may be recrystallised from a mixture of toluene and hexane. The resulting 4-hydroxymethyl-1-phospha-2,6,7-trioxabicyclo [2,2,2] octane-3-tert.butyl-4-hydroxy-5-methylphenyl-acetate (stabiliser No. 6) has a melting point of 99°C.

If in this Example the 3-tert.butyl-4-hydroxy-5-methylphenyl-acetic acid methyl ester is replaced by an equivalent amount of 3,5-dimethyl-4-hydroxyphenylacetic acid methyl ester and the process is otherwise carried out in analogous manner, the 4-hydroxymethyl-1-phospha-2,6,7-trioxabicyclo[2,2,2]octane-3,5-dimethyl-4-hydroxyphenyl acetate (stabiliser No. 7) is obtained with a melting point of 150°C.

EXAMPLE 7

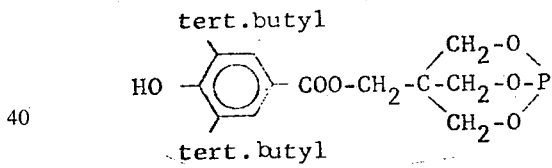

26.4 g of 3,5-ditert.butyl-4-hydroxybenzoic acid methyl ester and 16.4 g of 4-hydroxymethyl-1-phospha-2,6,7-trioxabicyclo [2,2,2] octane are heated together to 120°C and the resulting homogeneous melt is treated with 0.2 g of lithium amide. The flask is evacuated, the temperature broght to 150°C and kept thereat for 2 hours. After discharging and cooling, the mixture is treated with 150 ml of toluene, and the solution is then boiled and filtered. The product crystallises out on evaporation of filtrate and can be recrystallised from toluene. The resulting 4-hydroxymethyl-1-phospha-2,6,7-trioxabicyclo[2,2,2]octane-3,5-ditert.butyl-4-hydroxybenzoate (stabiliser No. 8) melts at 200°C.

EXAMPLE 8

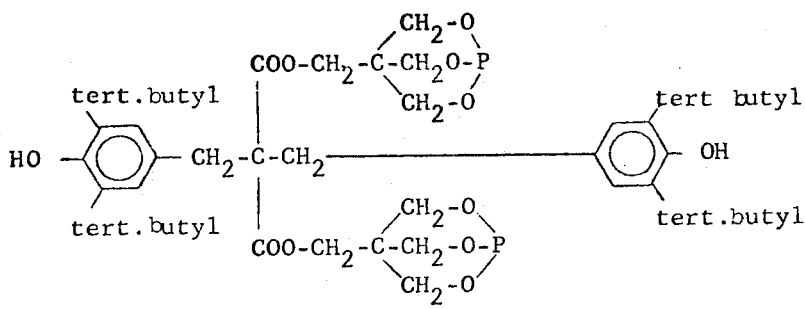

56.8 g of bis-(3,5-ditert.butyl-4-hydroxybenzyl)-malonic acid dimethyl ester and 32.8 g of 4-hydroxymethyl-1-phospha-2,6,7-trioxabicyclo[2,2,2]-octane are introduced into 100 ml of toluuene and the mixture is heated to the boil. toluene resulting homogeneous solution is cooled to 90°C and treated with 0.3 g of lithium amide. The reaction vessel is carefully evacuated, the methanol which has formed and the toluene being completely distilled off at an external temperature of 105°-120°C. The melt is treated with 100 ml of toluene, the solution boiled and filtered. The viscose residue which remains after evaporation of the filtrate is titrated with 150 ml of hexane, when it becomes solid and crystalline, yielding the bis-(4-hydroxymethyl-1-phospha-2,6,7-trioxabicyclo[2,2,2]octane)-bis(3,5-ditert.butyl-4-hydroxybenzyl)-malonate (stabiliser No. 9) with a melting point of 70°C.

If in this Example the bis-(3,5-ditert.butyl-4-hydroxybenzyl)-malonic acid dimethyl ester is replaced by an equivalent amount of 2 3,5-dialkyl-4hydroxybenzyl-malonic acid dialkyl ester of the following Table 2, and the process is otherwise carried out in analogous manner, the corresponding bis-(4-hydroxymethyl-1-phospha-2,6,7-trioxabicyclo[2,2,-2]octane)-3,5-dialkyl-4-hydroxybenzylmalonates are obtained in the form of slightly yellowish oils.

TABLE 2

| Dialkyl-hydroxybenzyl-malonate | Reaction Product |
|---|---|
| HO—C₆H₂(sec.butyl)₂—CH₂—C(COOCH₃)₂—CH₂—C₆H₂(sec.butyl)₂—OH | yellowish oil |
| HO—C₆H₂(tert.butyl)₂—CH₂—CH(COOCH₃)₂ | oil Stabiliser No.10 |
| HO—C₆H₂(cyclooctyl)₂—CH₂—C(COOCH₃)₂—CH₂—C₆H₂(cyclooctyl)₂—OH | wax-like solids |
| HO—C₆H₃(H)(CH₃)—CH₂—CH(COOC₂H₅)₂ | oil |
| HO—C₆H₃(H,CH₃)(CH₃)—CH₂—CH(COOC₂H₅)₂ | oil |
| HO—C₆H₂[CH(C₆H₅)CH₃]₂—CH₂—C(COOCH₃)₂—CH₂—C₆H₂[CH(C₆H₅)CH₃]₂—OH | oil |
| HO—C₆H₂[C(C₆H₅)(CH₃)₂]₂—CH₂—C(COOCH₃)₂—CH₂—C₆H₂[C(C₆H₅)(CH₃)₂]₂—OH | oil |

EXAMPLE 9

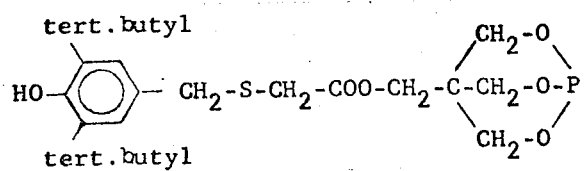

16.4 g of 4-hydroxymethyl-1-phospha-2,6,7-trioxabicyclo[2,2,2]octane and 32.4 g of S-(3,5-ditert.butyl-4-hydroxybenzyl)-thioglycolic acid methyl ester are heated together to 70°C, in the process of which a homogeneous melt forms. Upon addition of 0.4 g of lithium amide, the melt is heated to 120°C and methanol is distilled off. The melt is cooled, treated with 200 ml of toluene, the resulting solution boiled, filtered and evaporated. The residual oil is titrated with 100 ml of ligroin, in the process of which crystallization commences. After filtration and drying, 4-hydroxymethyl-1-phospha-2,6,7-trioxabicyclo[2,2,2]octane-S-(3,5-ditert.butyl-4-hydroxybenzyl)-thioglycolate (stabiliser No. 11) is obtained, which sinters at 70°C.

EXAMPLE 10

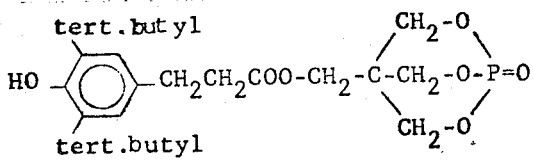

first Step 8.2 g of 4-hydroxymethyl-1-phospha-2,6,7-trioxabicyclo[2,2,2]-octane are dissolved in 160 ml of absolute alcohol. While stirring, 15 g of a 70 percent solution of cumene hydroperoxide in cumene are added. In the process, the mixture heats to about 55°C. Upon cooling, a precipitate forms which is filtered off and dried, to yield 4-hydroxymethyl-1-oxophospha-2,6,7-trioxabicyclo[2,2,2]-octane with a melting point of 220°C.

second Step 32.2 g of 3-(3,5-ditert.butyl-4-hydroxyphenyl)-propionic acid methyl ester and 18.0 g of 4-hydroxymethyl-1-oxophospha-2,6,7-trioxabicyclo[2,2,2]-octane are heated together to 150°C. While stirring, 0.4 g of sodium methylate is added, the mixture heated to 160°C and this temperature maintained for 12 hours. Upon cooling, the mixture is treated with 250 ml of toluene and filtered hot. The crystals which form after cooling are collected by suction filtration and dried, to yield 4-hydroxyamethyl-1-oxophospha-2,6,7-trioxabicyclo[2,2,2]octane-3-(3,5-ditert.butyl-4-hydroxyphenyl)-propionate (stabiliser No. 12) with a melting point of 183°C.

EXAMPLE 11

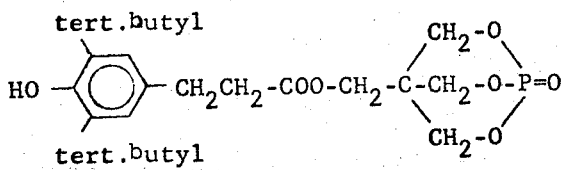

42.4 g of 4-hydroxymethyl-1-phospha-2,6,7-trioxabicyclo[2,2,2]octane-3-(3,5-ditert.butyl-4-hydroxyphenyl)-propionate (stabiliser No. 1, Example 1) are dissolved in 500 ml of dry ether by short boiling. The solution is treated with 25 g of a 70 percent solution of cumene hydroperoxide in cumene and the resulting mixture is stirred for 3 hours at room temperature. In the process, the product slowly falls out in the form of a white precipitate. The product is filtered off and recrystallised from alcohol to yield the 4-hydroxymethyl-1-oxophospha-2,6,7-trioxabicyclo[2,2,2]-octane-3-(3,5-ditert.butyl-4-hydroxyphenyl)-propionate (stabiliser No. 12) with a melting point of 183°C.

EXAMPLE 12

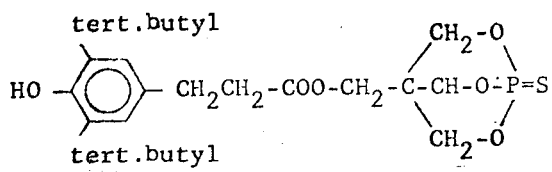

42.4 g of 4-hydroxymethyl-1-phospha-2,6,7-trioxabicyclo[2,2,2]octane-3,-(3,5-ditert.butyl-4-hydroxyphenyl)-propionate (stabiliser No. 1, Example 1) are boiled under reflux for 4 hours with 3.2 g of sulphur and 0.2 g of sodium sulphide in 100 ml of toluene. The solid which has precipitated on cooling of the reaction mixture is filtered with suction and recrystallised from toluene. The product is filtered and dried to yield the 4-hydroxymethyl-1-thiophospha-2,6,7-trioxabicyclo[2,2,2]octane-3-(3,5-ditert.butyl-4-hydroxyphenyl)propionate (stabiliser No. 13) with a melting point of 188°C.

In the following use examples, the stabilisers listed in Table 3 representing prior art were tested as comparative compounds conjointly:

Table 3

| Stabiliser No. | Chemical Name |
|---|---|
| 14 | pentaerythritol-tetrakis-[3-(3',5'-ditert.butyl-4-hydroxyphenyl)]-propionate |
| 15 | tris-nonylphenyl-phosphite |
| 16 | 1,3,5-tris-(3',5'-ditert.butyl-4'-hydroxybenzyl)-2,4,6-trimethyl-benzene |
| 17 | diethyl-(3,5-ditert.-butyl-4-hydroxybenzyl)-phosphonate |
| 18 | thiodiglycol-bis-[3-(3',5'-ditert.butyl-4-hydroxyphenyl)]-propionate |
| 19 | 1,1-bis-(5-tert.butyl-4-hydroxy-2-methylphenyl)-butane |
| 20 | 2,2'-methylene-bis(4-ethyl-6-t-butyl)-phenol |
| 21 | nickel-bis-(3,5-ditert.butyl-4-hydroxybenzyl)-ethyl-phosphonate |
| 22 | 2-(2'-hydroxy-5'-methylphenyl)benztriazole |
| 23 | 4-hydroxymethyl-1-phospha-2,6,7-trioxabicyclo-[2,2,2]-octane-stearate (m.p. 49°C) |
| 24 | octadecyl-3-(3',5'-ditert.butyl-4'-hydroxyphenyl)-propionate |
| 25 | tris-(3,5-ditert.butyl-4-hydroxybenzyl)-isocyanurate |

EXAMPLE 13

The additives listed in Table 4 are homogeneously incorporated in each case over Labor-Gelimat (Messrs. Draiswerke) into polyamide 12 (relative viscosity = 1.9; 0.5 percent in m-cresol) in a concentration of 1.0 percent, and these mixtures are pressed at 260°C into 1 mm sheets, from which 1 cm wide test strips are punched. The test specimens without additives which are required for purposes of comparison are manufactured in analogous manner. The test of the effectiveness of the additives incorporated in the test strips is carried out by over ageing in a forced draught oven at 150°C. The end product is defined as the time taken to reach the "brittle point." This is reached when failure occurs on bending the test specimen by hand. (Table 4, column 3). Table 4, column 2 indicates discoluourations caused by the additives in the polyamide test specimens as received before the oven ageing. An empirical colour scale is used, in which 5 denotes colourlessness, 4 a just percentible, slight discloluration, and 3, 2 and 1 denote succesively stronger discolouration.

Table 4

| Stabiliser No. | Colour of test Specimens as received | Oven ageing at 150°C Days to brittle point |
| --- | --- | --- |
| without additive | 5 | 1 |
| 1 | 5 | 30 |
| 2 | 5 | 28 |
| 3 | 5 | 27 |
| 4 | 5 | 21 |
| 9 | 5 | 30 |
| 11 | 5 | 13 |
| 13 | 5 | 14 |
| Comparative Products | | |
| 14 | 3 | 10 |
| 14+15(0,5%) | 3 | 10 |
| 16 | 3 | 8 |
| 16+15(0,5%) | 5 | 9 |
| 17 | 5 | 6 |
| 18 | 3 | 11 |

EXAMPLE 14

The additives listed in Table 5 are sprinkled dry in the indicated concentrations on polyamide 12 granules (relative viscosity = 1.9; 0.5 percent in m-cresol) and the coated granules are regranulated in each case at 260°C in a single screw extruder. Tensile bars 1 mm thick are extruded from the granules at 240°C in an injection moulding machine (Arburg); each bar measures 30 × 6 mm.

The test of the effenctiveness of the additives incorporated into the test specimens is carried out by means of oven ageing in a forced draught oven at 150°C. The thermooxidative degradation of the material during the oven ageing is followed up in three different ways:

a. periodic measurement of the relative viscosity of a 0.5 percent solution in m-cresol (Table 5, columns 2-6);

b. determination of the time until brittle point is reached, as described in Example 13 (Table 5, column 7);

c. peroidic determination of the tensile strength and of the time taken to the decrease in yield stress to 80 percent of its initial value (Table 5, column 8).

Table 5

| Bar No. (conc.) | a) Relative viscosity of solution after days of oven ageing at 150°C | | | | | b) Days taken to brittle point | c) Days taken to 80% residual yield Stress |
| --- | --- | --- | --- | --- | --- | --- | --- |
| | 0 | 5 | 10 | 20 | 30 | | |
| without additive | 1,90 | 1,4 | — | — | — | 1 | 1 |
| 1 (0,5%) | 1,85 | 1,80 | 1,68 | 1,58 | — | 17 | 21 |
| 1 (1,0%) | 1,85 | 1,82 | 1,78 | 1,70 | 1,62 | 30 | 27 |
| 9 (1,0%) | 1,90 | 1,84 | 1,79 | 1,72 | 1,61 | 31 | 28 |
| Comparative Products | | | | | | | |
| 14(1,0%) | 1,84 | 1,75 | 1,61 | 1,50 | — | 10 | 12 |
| 14(1,0%)+15(0,5%) | 1,85 | 1,76 | 1,63 | 1,55 | — | 11 | 13 |
| 17(1,0%) | 1,87 | 1,61 | 1,42 | — | — | 6 | 6 |
| 23(0,5%)+24(0,5%) | 1,85 | 1,51 | — | — | — | 4 | 4 |

As can be seen from Table 5, a greater heat stabilising effect is attained with the stabilisors according to the invention, judged by all three criteria, than with a commercially available stabiliser.

EXAMPLE 15

The additives listed in Table 6 are homogeneously incorporated in polyamide 12 (relative viscosity = 1.9; 0.5 percent in m-cresol) in a concentration of 1.0 percent over Labor-Gelimat (Draiswerke) and these mixtures are pressed into 1 mm thick sheets at 260°C from which 1 cm wide test strips are punched. The test specimes without additives required for purposes of comparison were manufactured in analogous manner.

The test of colour stability (yellowing) of the additives incorporated in the test strips is carried out by means of exposure in a xenotest device. To assess the intensity of discolourations which arise an empirical colour scale was used in which 5 denotes colourlessness, 4 is just perceptible, slight discolouration, and 3,2 and 1 denote successively stronger discolourations. Table 6 give the colour values directly after the incorporation and after an exposure time of 1000 hours.

Table 6

| Stabiliser No. | Colour evaluation | |
| --- | --- | --- |
| | after incorporation | after 1000 hours xenotest |
| 1 | 5 | 5 |
| 2 | 5 | 5 |
| 3 | 5 | 5 |
| 4 | 5 | 5 |
| 5 | 5 | 5 |
| 6 | 5 | 5 |
| 7 | 5 | 5 |
| 8 | 5 | 5 |
| 9 | 5 | 5 |
| 10 | 5 | 5 |
| 11 | 5 | 5 |
| 12 | 5 | 5 |
| 13 | 5 | 5 |
| Comparative Products | | |
| 14 | 3 | 2 |
| 14+15(0,5%) | 4 | 3 |
| 16 | 3 | 3 |
| 18 | 3 | 1 |
| 19 | 4 | 2 |
| 20 | 3 | 2 |
| 21 | 2 | 2 |

EXAMPLE 16

The additives listed in Table 7 are sprinkled dry in a concentration of 1 percent on polyamide 12 granules (relative viscosity = 1.9; 0.5 percent in m-cresol) and the coated granules are regranulated in each case at 260°C in a single screw extruder Tensile bars 1 mm thick are extruded from the granules at 240°C in an injection moulding machine (Arburg); dimension of each bar: 30 × 6 mm.

The test of effectiveness of the additive incorporated in the test specimens is carried out by oven ageing in a forced draught oven at 160°C. The thermo-oxidative degradation of the material during the oven ageing is followed up in two different ways:

a. by periodic measurement of the relative viscosity of a 0.5 percent solution in m-cresol (Table 7, columns 2 to 7);

b. by periodic determination of the tensile strength and of the time taken to decrease in yield stress to 80 percent of its initial value (Table 7, column 8)

Table 7

| Stabilizer No. conc.: 1% | a) Relative viscosity of solution after days of oven ageing at 160°C | | | | | | b) Days to 80% residual yield stress |
|---|---|---|---|---|---|---|---|
| | 0 | 3 | 5 | 7 | 9 | 12 | |
| without additive | 1,95 | 1,5 | — | — | — | — | 0,5 |
| 1 | 1,90 | 1,84 | 1,80 | 1,76 | 1,72 | 1,66 | 20 |
| 4 | 1,95 | 1,84 | 1,77 | 1,74 | 1,70 | 1,65 | 18 |

EXAMPLE 17

The additives listed in Table 8 are sprinkled dry in a concentration of 0.5 percent on dried polyamide 6 granules (relative viscosity = 2.9, 1 percent concentrated sulphuric acid) and coated granules are regranulated in a single screw extruder at 260°C. Pressed sheets (0.3 mm) are then manufactured likewise from the granules and 1cm wide test strips are punched from these sheets.

The test of the effectiveness of the additives incorporated into the test specimens is carried out by means of oven ageing in a forced draught oven at 154°C. The thermooxidative degradation of the material during the oven ageing is followed up by periodic measurement of the relative viscosity of a 1 percent solution in 96 percent sulphuric acid, in the process of which the time is ascertained after which the relative viscosity falls from 2.9 to a value of 2.0 (Table 8).

Table 8

| Stabiliser No. | Oven ageing time at 165°C for fall of relative viscosity of solutions from 2.9 to 2.0 in hours |
|---|---|
| without additive | 5 |
| 1 | 50 |
| Comparative Products | |
| 14 | 12 |
| 16 | 40 |
| 17 | 30 |
| 19 | 40 |
| 21 | 20 |
| 25 | 12 |

EXAMPLE 18

100 Parts of polypropylene (melt index 3.2 g/10 mins., 230°C/2160 g) are thoroughly mixed for 10 minutes in a shaking apparatus with 0.2 parts of one of the additives listed in the following Table 9.

The resulting mixture is kneaded for 10 minutes at 200°C in a Brabender plastograph and the composition thus obtained is subsequently pressed to 1 mm thick sheets in a day-light press at a temperature of 260°C. Strips 1 cm wide and 17 cm long are punched from these sheets.

The test of the effectiveness of the additive incorporated in the test strips is carried out by means of oven ageing in a forced draught oven at 135° and 149°C, a test strip which contains no additive serving as comparison. Three test strips of each formulation are used for this purpose. The end point is defined as the onset of the slightly visible decomposition of the test strip. The results are indicated in days.

Table 9

| Stabiliser No. | Days to onset of decomposition | |
|---|---|---|
| | 149°C | 135°C |
| without additive | ½ | 1 |
| 1 | 8 | 52 |
| 9 | 15 | 98 |
| Comparative Products | | |
| 20 | 5 | 40 |
| 17 | 2 | 10 |

EXAMPLE 19

The test specimens described in Example 18 were further tested for their colour stability, as follows:

a. after incorporation (Table 10, column 2);

b. after 500 hours exposure in a xenotest device of Messrs. Hanau (Table 10, column 3);

c. after a 1 week treatment with boiling water (Table 10, column 4).

For Table 10 an empiracal colour scale was used in which 5 denotes colourlessness, 4 a just perceptible, slight discolouration, and 3, 2 and 1 denote successively stronger disolouration.

Table 10

| Stabiliser No. | Colour Evaluation according to the Scale 1–5 | | |
|---|---|---|---|
| | after incorporation | after exposure | boiling water 1 week |
| 1 | 4 | 5 | 4 |
| 9 | 4 | 5 | 4 |
| Comparative Products | | | |
| 20 | 2 | 3 | 1 |
| 17 | 4 | 4 | 4 |

EXAMPLE 20

100 Parts of polypropylene (melt index 3.2 g/10 mins., 230°C/2160 g) are thoroughly mixed for 10 minutes in a shaking apparatus with 0.1 part of one of the additives in the following Table 11 and 0.3 part of dilaurylthiodiopropionate.

The resulting mixture is kneaded for 10 minutes at 200°C in a Brabender plastograph and the composition thus obtained is subsequently pressed in a day-light press at 260°C to 1 mm thick sheets from which strips 1 cm wide and 17 cm long are punched.

The test of the effectiveness of the additives incorporated in the strips is carried out by means of oven ageing in a forced draught oven at 135° and 149°C, with a test strip which contains only 0.3 part of dilaurylthiodiopropionate being used as comparison. For this purpose, three test strips of each formulation are used. The end point is defined as the onset of the slightly visible decomposition of the test strip, the results being given in days.

Table 11

| Stabiliser No. | Days to onset of decomposition | |
|---|---|---|
| | 149°C | 135°C |
| without additive | 5 | 11 |
| 1 | 20 | 95 |
| 9 | 28 | 115 |
| Comparative Products | | |
| 20 | 13 | 65 |
| 17 | 8 | 37 |

EXAMPLE 21

0.25 Parts of each of the additives listed in Table 12 is dissolved cold in 100 parts of a 25 percent polyurethane solution (ESTANE 5707, Mssrs. Goodrich). Using a film drawing device, films about 400μ thick are drawn from these solutions on a glass plate and which, after being dried for about 10 minutes at 140°C in a forced draught oven, dry out to films having a thickness of 100μ. The stabilisers are accordingly present in the films in a concentration of 1.0 percent. Samples of these films are exposed in a xenotest device on a white cardboard background until the onset of visually perceptible yellowing. The results of Table 12 are given in hours.

Table 12

| Stabiliser No. | Exposure time in a xenotest device to the point of clearly visible yellowing | Comments |
|---|---|---|
| without additive | 100 | |
| 1(0.5%) | 300 | |
| 1 | 400 | |
| 1 + 22 | 700 | |
| Comparative Products | | |
| 14 | 250 | |
| 14 + 22 | 500 | |
| 15 + 22 | 300 | |
| 17 | 200 | |
| 17 + 22 | 400 | |
| 19 | 150 | |
| 19 + 22 | 250 | |
| 24 | 200 | incompatible |
| 24 + 22 | 400 | incompatible |
| 16 | 150 | incompatible |
| 16 + 22 | 250 | incompatible |
| 25 + 22 | 250 | incompatible |
| 22 | 200 | incompatible |

As may be seen from Table 12, the stabiliser according to the invention effects excellent protection against the yellowing of polyurethane films, both when it is used alone and in combination with co-additives.

EXAMPLE 22

Protection against yellowing of polyacrylonitrile (PAN)

0.5 Part of stabiliser 1 together with 25 parts of PAN are dissolved over 4 hours in 75 parts of dimethyl formamide (DMF) at 70°C. In a visual comparison, the stabilised solution already shows a distinctly brighter colour than the solution which is free from additive. Films about 500μ thick are drawn on a glass plate from these solutions and dried for 10 minutes at 125°C.

The dried films are visually assessed on a white background for their degree of yellowing as shown below:

Table 13

| | Discolouration |
|---|---|
| additive-free comparative colour | yellow |
| 0.5% of stabiliser 1 | white with very faint trace of yellowing |

The same results are obtained if another solvent, for example ethylene carbonate/water mixture (80:20), is used instead of dimethyl formamide.

EXAMPLE 23

Stabilising of ABS

Stabiliser 1 (0.3 percent) is sprinkled on unstabilised ABS resin and the coated granules are regranulated at 240°C in a single screw extruder. For purpose of comparison, granules without stabiliser 1 are manufactured in the same manner. The granules are extruded in the conventional manner in an injection moulding machine at 250°C to sheets. The sheets are aged in a forced draught oven for 10 days at 80°C and the colour behaviour evaluated.

Table 14

| | Colour of the sheets | |
|---|---|---|
| | Original state | after 10 days at 80°C |
| without stabiliser | yellowish beige | brownish yellow |
| 0.3% stabiliser 1 | light beige | light beige |

By adding 0.3 percent of stabiliser 1 the colour of ABS in the original state is improved and discolouration during oven ageing prevented.

EXAMPLE 24

Stabilising against degradation of polypropylene during processing

The stabilisers of Table 15 below are homogeneously mixed in the given concentrations with polyporpylene powder ("Propathene HF20," ICI) and regranulated 5 times successively in a single screw extruder at a maximum temperature of 260°C and at 100 rpm. The melt index (MI) of the material is measured in each case after the 1st., 3rd. and 5th. extrusion (2160 g load at 230°C; g/10 mins.). A degradation of the polymer is expressed in a rapid rise of the melt index.

Table 15

| Stabiliser No. (conc.) | MI/2160 g at 230°C in g/10 mins. | | | |
|---|---|---|---|---|
| | original state | 1st. extrusion | 3rd. extrusion | 5th. extrusion |
| without stabiliser | 2,50 | 5,30 | 27,2 | 38,5 |
| 1 (0,1%) | 2,50 | 3,16 | 4,80 | 6,55 |
| 1 (0,05%) | 2,50 | 3,95 | 6,34 | 9,40 |
| 14(0,05%) + 1 (0,05%) | 2,50 | 3,58 | 4,90 | 6,94 |
| 24(0,05%) + 1 (0,05%) | 2,50 | 2,50 | 4,64 | 7,05 |
| 16(0,05%) + 1 (0,05%) | 2,50 | 2,50 | 4,36 | 6,46 |
| 19(0,05%) + 1 (0,05%) | 2,50 | 2,92 | 4,96 | 7,54 |
| 25(0,05%) + 1 (0,05%) | 2,50 | 4,11 | 5,22 | 8,25 |
| Comparative Products | | | | |
| 14(0,1%) | 2,50 | 4,10 | 7,37 | 10,7 |
| 24(0,1%) | 2,50 | 4,44 | 8,26 | 13,40 |
| 16(0,1%) | 2,50 | 3,87 | 6,82 | 10,4 |
| 19(0,1%) | 2,50 | 4,26 | 8,10 | 12,76 |
| 25(0,1%) | 2,50 | 5,95 | 8,10 | 10,45 |

As is evident from the figures of Table 15, the stabiliser 1 according to the invention improve the stability of the polymer not only when used alone, but also in combination with conventional phenolic antioxidants.

In addition to stabilising the melt index, stabiliser 1 effects a distinct improvement in colour, even after multiple extrusion, in comparaison to unstabilised material.

EXAMPLE 25

Stabilising of EPDM a. Manufacture of the test specimens

100 Parts of unstabilised ethylene-propylene-rubber and 0.1 part of each of the stabilisers listed in Table 16 are homogenised for 10 minutes at 150°C and 60 rmp in a Brabender plastograph fitted with a roll kneader type 50EC. The thus stabilised mixtures are pressed to 1 mm thick sheets in a day-light press at 120°C for 5 minutes. The unstabilised rubber sheet which is used for comparison is manufactured in the same manner.

b. Test

The gel content determined after storage in air at elevated temperatures serves as yardstick for evaluating the protective action of the incorporated stabilisers. For this purpose, the test specimens obtained as described above are kept on an aluminum base in a forced draught oven at 100 examined after 5 and 10 days for their gel countent, which is determined as follows:

About 1 g of the specimens are cut into pieces of about 3 × 3 × 1 mm and dissolved overnight at room temperature in 100 ml of n-hexane. These solutions are filtered through glass wool and the gel particles retained by the glass wool are washed with 3 × 20 ml of n-hexane. The filtered solutions are evaporated to dryness and dried to constant weight. The gel content of the test specimen is obtained by the following calculation:

$$\text{gel content in \%} = \frac{E-A}{E} \cdot 100$$

wherein
E = total weight of the tested specimen
A = weight of the dissolved portion of the tested specimen.

The results of the gel determination after oven ageing are summarised in the following Table 16:

Table 16

| Stabiliser No. | Gel content in % after ageing in air at 100°C | | | |
|---|---|---|---|---|
| | 5 days | 10 days | 15 days | 20 days |
| without stabiliser | 2 | 84 | 83 | 81 |
| 1 | 0 | 0 | 1 | 1 |
| 11 | 0 | 1 | 1 | 2 |
| Comparative Products | | | | |
| 15 | 4 | 65 | 85 | 85 |
| 23 | 5 | 85 | 84 | 80 |
| 24 | 0 | 3 | 10 | 15 |

EXAMPLE 26

Stabilising of impact resistant polystyrene

100 Parts of impact resistant polystyrene containing about 8 parts of polybutadiene are mixed dry in a mixing device with 0.1 part of each of the 17 stabilisers listed in Table 17 and these mixtures are then homogenised at 220°C for 30 minutes in a Brabender plastograph (roll kneader 50 EC). The material is subsequently pressed to 1 mm sheets at 220°C and assessed visually for discolouration which has occurred during the Brabender treatment. For comparative purposes, unstabilised polymer is subjected to the same treatment. The results are summarised in the following Table 17:

Table 17

| Stabiliser No. | Colour after Brabender treatment 30 minutes at 220°C |
|---|---|
| without stabiliser | brownish yellow, opaque |
| 1 | white, opaque (no change in colour compared with a test specimen without brabender treatment) |

EXAMPLE 27

Stabilising of polystyrene

100 Parts each of crystal clear polystyrene granules are mixed dry in a mixer with the following additives:
mixture I : no additive
mixture II : 0.25 part of stabiliser No. 22 (UV rays absorbing agent)
mixture III: 0.25 part of stabiliser No. 1
mixture IV: 0.15 part of stabiliser No. 22 0.1 part of stabiliser No. 1

These mixtures are granulated in an extruder and then extruded at 280°C in an injection moulding machine to sheets about 1.5 mm thick.

The resulting sheets are exposed for 1500 hours in a xenotest device (type 150) and the yellowing which occurs is determined by means of the yellowig factor YF as follows:

$$YF = \frac{\Delta^{T}420 - \Delta^{T}680}{T\ 560} \cdot 100$$

wherein T denotes the transmission losses which have occured as a result of exposure measured in the wave lengths 420 and 680 nm, and $T_{560}$ denotes the transmission value in percent of an unexposed test specimen measured in the wave length of 560 nm. The yellowing factors calculated from the transmission measurements of the exposed test specimens are summarised in the following Table 18:

Table 18

| Mixture No. | Yellowing factor after 150°C hours xenotest 150 |
|---|---|
| I | 20,6 |
| II | 3,3 |
| III | 12,4 |
| IV | 1,7 |

The results show that the partial replacement of the UV rays absorbing agent (stabiliser No. 22) by the stabiliser No. 1 gives a better protection against yellowing than each of the individual components.

EXAMPLE 28

Stabilising against cross-linking of high molecular low pressure polyethylene during processing 0.05 percent of stabiliser 1 is homogeneously mixed with the polyethylene powder (MG~250.000) and the mix is regranulated in a single screw extruder at a maximum temperature of 200°C and 100 rpm. For comparison, granules without addition of stabiliser 1 is manufactured in the same manner. The melt index (MI) of the starting material and the extruder granules was determined.

The oxidative damage to the polymer material caused by the thermal stress during the extrusion effects a cross-linking of the polymer and is expressed by a sharply increased viscosity of the polymer melt and thus a greatly reduced melt index (Table 19).

Table 19

| | MI (10 kg at 230°C) g/10 minutes | |
|---|---|---|
| | original state | after extrusion |
| without stabiliser | 0,5 | 0,1 |
| 0,05% of stabiliser 1 | 0,5 | 0,5 |

In addition to stabilising the melt index, stabiliser 1 effects a distinct improvement in colour after the regranulation in comparison to unstabilised material.

EXAMPLE 29

Stabilising of very high molecular polyethylene against crosslinking during the thermal-mechanical stress 0.3 Part of stabiliser 1 is mixed dry with 100 parts of high molecular polyethylene (MG~1,000,000) and the mix is subsequently kneaded for a total of 7 minutes at 240°C and 40 rpm in a Brabender plastograph. The thus treated mixture is pressed into sheets and examined for its gel content. For this purpose, the material in the form of fine chips is extracted for 10 hours with xylene and the residue left after the extraction is determined; this residue constitutes the cross-linked, insoluble gel portion. For comparison, a mixture which contains no stabiliser is treated in the same manner. The results are summarised in the following Table 20:

Table 20

| Stabiliser No. | Gel content after Brabender treatment 7 mins./240°C, 40 rpm |
|---|---|
| without additive unkneated | 0 |
| | 44 |
| with 0.3% stabiliser 1 kneated | 0 |
| with 0.3% stabiliser 14 kneated | 8 |

EXAMPLE 30

Stabilising of polyvinyl chloride

70 Parts by weight of polyvinyl chloride (Solvic 239) manufactured by the suspension process, 30 parts by weight of dioctyl phthalate, 0.44 par by weight of cadmium laurate, 0.66 part of barium laurate and 0.3 part by weight of a co-stabiliser were mixed for 5 minutes at 165°C in a laboratory roll mill. The sheets obtained in this way were subjected to a heat test in an oven of constant temperature at 180°C, by taking samples from the oven at intervals of 15 minutes and determining the degree of decomposition. Stabiliser 1 or bisphenol A was used as costabiliser. The following Table 21 gives the visually recognisable degree of decomposition with the stabiliser according to the invention and the comparative stabiliser bisphenol A:

Table 21

| Costabiliser | Rolled sheet | 15' | 30' | 45' | 60' | 75' | 90' | 105' | 120' | 135' |
|---|---|---|---|---|---|---|---|---|---|---|
| stabiliser | colourless | colourless | colourless | colourless | colourless | faintly yellow | faintly yellow | faintly yellow | yellowish brown | black |
| bisphenol A | colourless | colourless | colourless | faintly yellow | faintly yellow | faintly yellow | yellowish brown | black | | |

As may be seen from the Table, a substantially greated heat stabilising action is achieved with the stabiliser according to the invention than with a conventional commercial stabiliser.

EXAMPLE 31

Stabilising of polyethylene terephthalate

In a stirring autoclave, 235 parts of dimethyl terephthalate are transesterified in the presence of 0.04 part of zinc acetate and 0.06 part of antimony trioxide with 170 parts of ethylene glycol at temperatures of 150° to 210°C, in the process of which the methanol which is liberated is distilled off over a suitable column. For the subsequent polycondensation, the transesterification product is heated gradually while stirring to 285°C, the pressure simultaneously gradually reduced to 0.5 Torr and these conditions are kept for 5 hours. In the process a polyester is obtained with a relative viscosity of 1.65 (1 percent in m-cresol, 25°C) and a yellowish natural colour.

If the process described above is repeated, except that 0.26 part of the stabiliser 1 (dissolved in ethylene glycol) is added about half way through the polycondensation, a polyester with the relative viscosity of 1.60 is obtained after completion of the usual reaction time, but whose natural colour is very much brighter than that of the comparative test specimen which contains no additive. The same applies for the filaments spun from the two polyester test specimens.

EXAMPLE 32

Protection agains yellowish of dimethyl terephthalate

The dimethyl terephthalate together with the additives listed in Table 22 in a concentration of 0.01 percent kept for 20 hours at 200°C in a glass tube under nitrogen. The yellowings which have occured during this treatment are evaluated according to an empirical colour scale in which 5 denotes colourlessness, 4 a just perceptible, slight discolouration, and 3, 2 and 1 successively denote stronger discolouration.

Table 22

| Additives | Yellowing Rating |
|---|---|
| without additive | 1 |
| tris-nonylphenylphosphite | 2 |
| 4-hydroxy-3,5-ditert.butyl-benzyl-phosphoric diethyl ester | 3-4 |
| stabiliser 1 | 5 |

EXAMPLE 33

100 Parts of polypropylene (melt index 20 g/10 mins., 230°C/2160 g) are thoroughly mixed in a shaking apparatus for 10 minutes with 0.2 part of the stabiliser No. 24 and 0.5 part of stabiliser No. 8.

The resulting mix is kneaded for 10 minutes at 200°C in a Brabender plastograph, the composition thus obtained then in a precision press at 260°C to 0.1 mm thick sheets which are subsequently kept in an oven for 1 hour at exactly 150°C and then chilled in tap water (temperature about 13°C). Test specimens measuring 44 × 60 mm are cut from the resulting sheets.

The test of stabiliser No. 8 for its effectiveness as stabiliser against damaging effects on exposure of the polymer is carried out in an exposure device of type "enotest 150" (Hanau), with a sheets which contains only stabiliser No. 24 being used for comparison. To determine the end point, tensile bars 40 mm long are punched from the exposed sheets and examined periodically for their elongation. The end point is reached as soon as the residual elongation has sunk to 50 percent of its initial value.

Table 23

| Stabiliser No. | Hours to 50% residual elongation |
|---|---|
| 24(0,2 %) | 800 |
| 24(0,2 %) + 8(0,5 %) | 2070 |

The results show that the addition of 0.5 percent of stabiliser No. 8 effects a light fastness of polypropylene which corresponds to about 2.6 times the value of an unstabilised test specimen.

EXAMPLE 24

100 Parts of polycarbonate powder ("Lexan 145-111," General Electric, which had been dried previously in a vacuum oven for 12 hours at 120°C) are thoroughly mixed for 10 minutes in a shaking apparatus with 0.1 part of stabiliser No. 1. The resulting mix is extruded in a laboratory single screw extruder ("Killion") at 290°C nozzle temperature and 110 rpm and subsequently granulated. The granules required for purposes of comparison without addition of the stabiliser are manufactured in analogous manner. Before the further processing, the granules are dried in a vacuum oven for 12 hours at 120°C.

The test of the effectiveness of the incorporated stabiliser No. 1 as stabiliser against the yellowing of material under extreme thermal stress takes place in a laboratory injection moulding machine at 315°C. The yellowing is evuluated on the moulded sheets according to the Hunter Scale (Wyszecki-Stiles, Colour Science, John Wiley, N.Y, page 460) after increasing retention times in the injection cylinder. Yellowing is represented by descending values on the Hunter Scale (Table 24).

Table 24

| Stabiliser No. | Hunter values according to the given retention times in the cylinder | | | | | |
|---|---|---|---|---|---|---|
| | 2 mins. | 5 mins. | 10 mins. | 15 mins. | 20 mins. | 25 mins. |
| without stabiliser | 64 | 59 | 48 | 41 | 35 | 34 |
| 1 (0,1 %) | 81 | 81 | 80 | 82 | 80 | 80 |

The results show that stabiliser No. 1 practically completely suppresses the yellowing tendency of polycarbonate at the high temperatures necessary for the processing.

EXAMPLE 35

Stabilising of styrene-butadiene copolymers (SBR)

a. Manufacture of test specimen

100 Parts of an unstabilised styrene-butadiene rubber (emulsion SBR "Synpol 1500," Texas U.S. Chem. Corp.) are homogenised for 10 minutes in a Brabender plastograph at 150°C and 60 rpm with 0.125 part each of the stabilisers listed in Table 25. The thus stabilised mixtures are pressed to 1 mm thick sheets in a day-light press at 120°C for 5 minutes. The unstabilised rubber sheet which is used as comparison is manufactured in the same manner.

b. Test

The gel content determined after storage in air at elevated temperatures serves as yardstick for evaluating the protective action of the incorporated stabilisers. For this purpose, the test specimens obtained above are kept on an aluminium base in a forced draught oven at 100°C and examined periodically (about every 10 hours) for their gel content, which is determined as follows:

About 1 g of the test speciments are cut in pieces about $3 \times 3 \times 1$ mm in size and dissolved overnight at room temperature in 100 ml of n-hexane. These solutions are filtered through glass wool, the gel particles which have been retained by the glass wool are washed with $3 \times 20$ ml of n-hexane. The filtered solutions are evaporated to dryness and dried to constant weight. The gel content of a test specimen is then obtained according to the following calculation:

$$\text{gel content in \%} = \frac{E - A}{E} \cdot 100$$

wherein

E = total weight of the tested specimen
A = weight of the dissolved portion of the tested specimen.

The end point is defined as the time after which a sudden rise in the gel content occurs after an induction period characteristic for the tested additive (Table 25).

Table 25

| Stabiliser No. (0,125%) | Induction period to the rapid occurrence of a high gel content |
|---|---|
| without stabiliser | 5 hours |
| 1 | 40 hours |
| 2 | 35 hours |
| 24 | 20 hours |

I claim

1. A composition of matter comprising an organic polymer subject to thermo oxidative or light-induced degradation and from 0.005 to 5 percent by weight of a stabilizing compound of the general formula

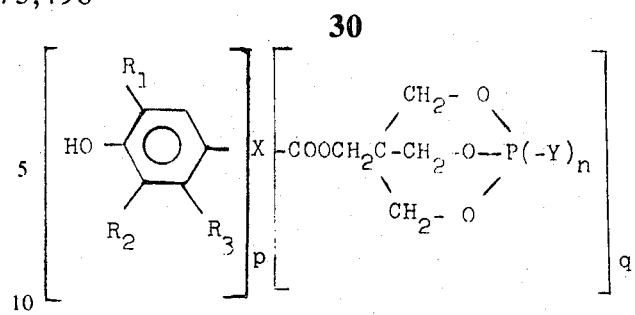

wherein

X represents the radical of an alkane containing from 1–19 carbon atoms, and in which radical not more than three bonds are formed between the same carbon atoms and the carboxyl and phenol groups, the radical of an aralkane, alkene, oxaalkane or thiaalkane each containing from 2–19 carbon atoms, and in which radicals not more than three bonds are formed between the same carbon atom and the carboxyl and phenol groups or represents the direct bond, $R_1$ and $R_2$ independently represent hydrogen, alkyl containing 1–8 carbon atoms, cycloalkyl containing from 6–8 carbon atoms or aralkyl containing from 7–9 carbon atoms, $R_3$ represents hydrogen or methyl, Y represents oxygen or sulphur, p and q independently represent 1 or 2, and n represents 0 or 1.

2. A composition of claim 1 containing from 0.1 to 1 percent by weight of the stabilizing compound.

3. A composition of matter according to claim 1 wherein $R_1$ represents alkyl containing from 1–18 carbon atoms, cycloalkyl containing from 6–8 carbon atoms or aralkyl containing 7–9 carbon atoms, and $R_3$ represents hydrogen.

4. A composition according to claim 3 wherein the polymer is a polyamide.

5. A composition according to claim 3 wherein the polymer is a polyolefin.

6. A composition according to claim 5 wherein the polyolefin is polypropylene.

7. A composition according to claim 6 wherein the polymer is polyethylene.

8. A composition according to claim 3 wherein the polymer is polystyrene.

9. A composition according to claim 3 wherein the polymer is a terpolymer of ethylene, propylene and a diene.

10. A composition according to claim 3 wherein the polymer is polyacrylonitrile.

11. A composition according to claim 3 wherein the polymer is a copolymer of acrylonitrile, butadiene and styrene.

12. A composition accordiing to claim 3 wherein the polymer is a vinyl polymer which contains halogen.

13. A composition according to claim 3 wherein the polymer is a polyester.

14. A composition according to claim 3 wherein the polymer is a polyurethane.

15. A composition according to claim 3 wherein the polymer is a polycarbonate.

* * * * *